(12) United States Patent
Park et al.

(10) Patent No.: US 7,509,501 B2
(45) Date of Patent: Mar. 24, 2009

(54) CRYPTOGRAPHIC APPARATUS FOR SUPPORTING MULTIPLE MODES

(75) Inventors: Tae-Gon Park, Suwon-shi (KR);
Kyung-Wan Nam, Sungnam-shi (KR);
Young-Wook Park, Ahnyang-shi (KR)

(73) Assignee: Samsung Electronics Co., Ltd. (KR)

( * ) Notice: Subject to any disclaimer, the term of this patent is extended or adjusted under 35 U.S.C. 154(b) by 609 days.

(21) Appl. No.: 10/744,125

(22) Filed: Dec. 23, 2003

(65) Prior Publication Data

US 2004/0148512 A1 Jul. 29, 2004

(30) Foreign Application Priority Data

Jan. 24, 2003 (KR) .................... 10-2003-0004806

(51) Int. Cl.
*G06F 11/30* (2006.01)
*G06F 12/14* (2006.01)
*H04L 9/32* (2006.01)

(52) U.S. Cl. .................................... 713/193
(58) Field of Classification Search ............... 713/189
See application file for complete search history.

(56) References Cited

U.S. PATENT DOCUMENTS

| | | | |
|---|---|---|---|
| 6,061,449 A | 5/2000 | Candelore et al. | |
| 6,295,604 B1* | 9/2001 | Callum | 713/160 |
| 6,324,286 B1* | 11/2001 | Lai et al. | 380/29 |
| 6,460,095 B1 | 10/2002 | Ueno et al. | |
| 2004/0123121 A1* | 6/2004 | Paaske et al. | 713/189 |
| 2004/0250095 A1* | 12/2004 | Feldman | 713/191 |

FOREIGN PATENT DOCUMENTS

| | | |
|---|---|---|
| JP | 07-261662 | 10/1995 |
| TW | 445402 | 7/2001 |
| TW | 468342 | 12/2001 |

OTHER PUBLICATIONS

"High-Throughput Programmable Cryptocoprocessor", Alireza Hodjat and Ingrid Varbauwhede, UCLA, Published by IEEE Computer Society 2004.*
"Comments to NIST concerning AES Modes of Operations: CTR-Mode Encryption" Helger Lipmaa, Phillip Rogaway, David Wagner, Oct. 2000.*
Intel High Performance Performance Programmable DMA controller, Sep. 1993, 8237A-5.*

* cited by examiner

*Primary Examiner*—Kambiz Zand
*Assistant Examiner*—Harris C Wang
(74) *Attorney, Agent, or Firm*—Mills & Onello LLP

(57) ABSTRACT

The present invention relates to a cryptographic apparatus for encrypting data stored in a memory. The cryptographic apparatus of the present invention operates in the ECB, CBC, CBC-MAC, counter and OCB modes using small and simple elements. The cryptographic apparatus minimizes data communication between CPU and the cryptographic apparatus to improve the performance of the communication system. On the other hand, the input buffer and output buffer of the cryptographic apparatus are configured to store at least two blocks respectively, so that the performance of the cryptographic apparatus is maximized. Furthermore, the cryptographic apparatus supports zero-padding, so that the process of the CPU is minimized.

2 Claims, 12 Drawing Sheets

CRYPTOGRAPHIC APPARATUS FOR SUPPORTING MULTIPLE MODES

RELATED APPLICATIONS

This application claims priority to Korean Patent Application number 03-4806, filed on Jan. 24, 2003, the contents of which are incorporated herein in their entirety by reference.

BACKGROUND OF THE INVENTION

1. Field of the Invention

The present invention relates to data cryptography, and more particularly, to a cryptographic apparatus for encrypting and decrypting data.

2. Description of the Related Art

Cryptography technology is frequently used to ensure message transmission security. In cryptography technology, a message (hereafter, referred to as plain text) is encrypted at a transmission side and a message (hereafter, referred to as cipher text) is decrypted or decoded at a receiving side. Such an encryption and a decryption of the messages are well known as cryptography technology.

The data encryption standard (DES) is a block unit encryption protocol employed in many nations and American National Standards Institute (ANSI). Also, there are 3-DES, AES and the like as examples of the encryption protocol. In the block unit encryption protocol, various modes, i.e., electronic codebook (ECB), cipher block chaining (CBC), output feedback (OFB), cipher feedback (CFB), and the like are defined. Recently, counter mode and offset codebook (OCB) mode have been suggested.

These various modes can be implemented by individual hardware. However, to implement the various modes in one chip, many gates are required.

SUMMARY OF THE INVENTION

Accordingly, the present invention is directed to a cryptographic apparatus for supporting multiple modes that substantially obviates one or more problems due to limitations and disadvantages of the related art.

It is an object of the present invention to provide a cryptographic apparatus for supporting multiple modes.

It is another object of the present invention to provide a cryptographic apparatus for supporting multiple modes while the cryptographic apparatus has a simple circuit configuration.

It is another object of the present invention to provide a communication system for supporting multiple modes.

In an aspect of the present invention, there is provided a cryptographic apparatus for encrypting data stored in a memory. The apparatus includes: a control unit for generating control signals in response to externally supplied encryption information; a memory controller for reading out the data from the memory; an input buffer for storing the data read out by the memory controller; an encryption unit for encrypting a data block stored in the input buffer; and an output buffer for storing the data encrypted by the encryption unit. The memory controller writes the encrypted data stored in the output buffer to the memory, and the memory controller, the input buffer, the encryption unit and the output buffer operate in response to the control signals.

In one embodiment, the control unit generates a mode signal indicating an initial vector and an operation mode in response to the encryption information.

In this embodiment, the operation mode can be any one of electronic codebook (ECB) mode, cipher block chaining (CBC) mode, CBC-message authentication (CBC-MAC) mode and counter (CNT) mode.

In this embodiment, the encryption unit can include: a data input register for storing data supplied from the input buffer; an encryptor for encrypting the data stored in the data input data; and a data output register for storing the data encrypted by the encryptor.

In this embodiment, the encryption unit can operate in the ECB mode.

In one embodiment, the encryption unit further includes: an initial vector register for storing an initial vector supplied from the control unit; and a first logic operator for performing a logic operation on the initial vector stored in the initial vector register and data stored in the data input register.

In this embodiment, the encryption unit can operate in any one of the CBC mode and the CBC-MAC mode.

In one embodiment, the encryption unit can operate in the CBC-MAC mode, the memory controller does not write the encrypted data stored in the output buffer to the memory.

In one embodiment, the encryption unit can include: an initial vector register for storing an initial vector supplied from the control unit; an adder for adding a predetermined value to data stored in the initial vector register and storing the added data in the initial vector register; an encryptor for encrypting the data stored in the initial vector register; a data input register for storing data from the input buffer; a second logic operator for performing a logic operation on the data encrypted by the encryptor and the data stored in the data input register; and a data output register for storing an output of the second logic operator.

In this embodiment, the encryption unit can operate in the CNT mode.

In one embodiment, the encryption unit can include: an initial vector register for storing an initial vector supplied from the control unit; a data input register for storing the data supplied from the input buffer; an encryptor for encrypting input data; a data output register for storing data to be supplied to the output buffer; an adder; a first selection circuit for supplying any one of data stored in the initial vector register, result data of logic operation of the data stored in the initial vector register and the data stored in the data input register, and the data stored in the data input register to the encryptor as input data in response to the mode signal, and supplying the data stored in the initial vector register to the adder in response to the mode signal; and a second selection circuit for supplying any one of result data of logic operation of the data stored in the data input register and the data encrypted by the block encryptor, and the data encrypted by the block encryptor to the data output register in response to the mode signal, and supplying the data encrypted by the encryptor to the initial vector register in response to the mode signal. The adder adds a predetermined value to data supplied from the first selection circuit and stores it in the initial vector register.

In this embodiment, the first selection circuit can include: a first multiplexer; a first logic operator; a second multiplexer for supplying the data stored in the initial vector register to both the adder and the first multiplexer or the first logic operator in response to the mode signal; and a third multiplexer for supplying the data stored in the initial vector register to the first logic operator or the first multiplexer in response to the mode signal. The first logic operator received outputs from the second and third multiplexers and performs logic operation on them, and the first multiplexer transfers any one of an output of the second multiplexer, an output of the first logic operator and an output of the third multiplexer to the encryption. The second selection circuit can include: a fourth multiplexer; a second logic operator; and a fifth multiplexer for transferring an output of the encryption to any of the second logic operator, the fourth multiplexer, the initial vector register and both the fourth multiplexer and the initial vector register in response to the mode signal. The second logic operator receives outputs of the third and fifth multiplexers and performs logic operation, and the fourth multiplexer transfers an output of the second logic operator and an output of the fifth multiplexer as the data output data.

In one embodiment, the control unit controls to supply the data stored in the input buffer to the encryption unit block by block.

In this embodiment, the control unit can perform zero-padding when last data stored in the input buffer are less than a predetermined block size.

In one embodiment, the input buffer is a First-In First-Out (FIFO) buffer. The input buffer stores at least two data blocks.

In one embodiment, the output buffer is a First-In First-Out (FIFO) buffer. The output buffer can store at least two encrypted data blocks.

In one embodiment, the memory controller is a direct memory access (DMA) controller.

In another aspect of the present invention, there is provided a communication system including: a memory; a cryptographic apparatus for encrypting data stored in the memory; and a central processing device for controlling operation of the encrypting device. The cryptographic apparatus includes: a control unit for generating control signals in response to encryption information supplied from the central processing device; a memory controller for reading out the data from the memory; an input buffer for storing the data read out by the memory controller; an encryption unit for encrypting a data block stored in the input buffer; and an output buffer for storing the data encrypted by the encryption unit. The memory controller writes the encrypted data stored in the output buffer to the memory, and the memory controller, the input buffer, the encryption unit and the output buffer operate in response to the control signals.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
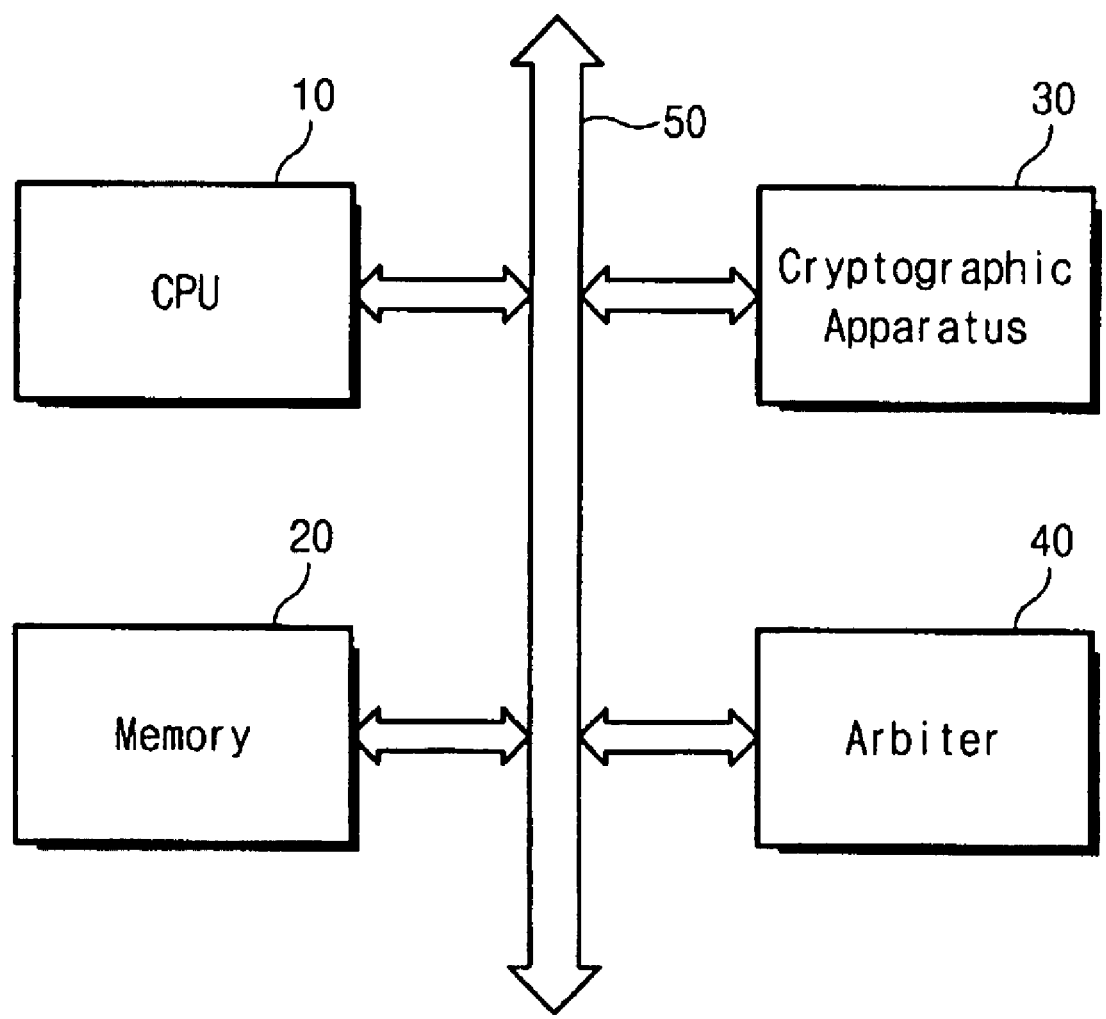
FIG. 1 contains a communication system having a cryptographic apparatus according to a preferred embodiment of the present invention.

FIG. 1 illustrates a communication system having a cryptographic apparatus according to a preferred embodiment of the present invention. As the communication system provided with a cryptographic apparatus, there can be a desktop computer, a portable computer, a PDA, a mobile communication terminal and the like. Referring to FIG. 1, a communication system includes a CPU 10, a memory 20, a cryptographic apparatus 30, an arbiter 40 and a system bus 50. The memory 20 stores an encryption program and stores plain text and a cipher text. The CPU 10 controls the cryptographic apparatus 30 to operate according to an encryption program stored in the memory 20. The arbiter 40 authorizes a DMA master to use the system bus 50 when many DMA masters are connected to the system bus 50. In the communication system shown in FIG. 1, since the CPU 10 and the encryption unit 30 assume the role of a DMA master, the arbiter 40 is used.

Figure 2:
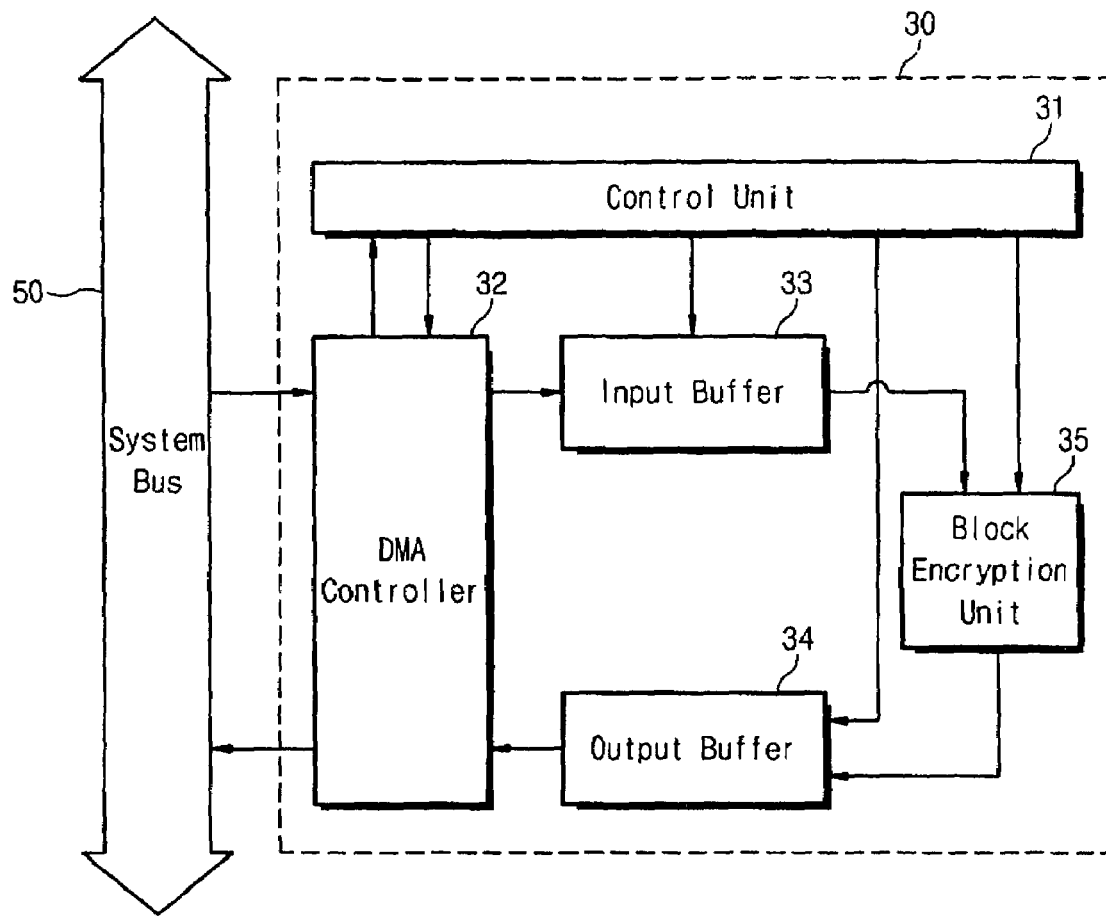
FIG. 2 contains a block diagram of the cryptographic apparatus shown in FIG. 1.

FIG. 2 illustrates a detailed configuration of the cryptographic apparatus 30 shown in FIG. 1. Referring to FIG. 2, the cryptographic apparatus 30 includes a control unit 31, a DMA controller 32, an input buffer 33, an output buffer 34, and a block encryption unit 35. The control unit 31 controls components in the cryptographic apparatus 30 if the encryption information supplied from the CPU 10, that is, source address SA, destination address DA, data size D_SIZE, block size B_SIZE, key K, key size, direction (encryption and decryption), initial vector and mode are inputted. The DMA controller 32 reads out the plain text stored at the source address of the memory 20, stores it in the input buffer 33 and stores the cipher text stored in the output buffer 34 to the destination address of the memory 20. The plain text stored in the input buffer 33 is transferred to the block encryption unit 35 block by block. For example, if the block encryption unit 35 consists of 128-bit AES, the size of the block transferred from the input buffer 33 to the block encryption unit 35 is 128 bits. The output buffer 34 stores the cipher text block from the block encryption unit 35 and transfers the stored cipher text to the DMA controller 32 according to control of the control unit 31. The input buffer 33 and the output buffer 34 include a First-In First-Out (FIFO) buffer. Their sizes are double that of the block processed at the block encryption unit 35. Therefore, the input buffer 33 and the output buffer 34 can store two blocks respectively. For example, if the plain text size that the block encryption unit 35 can process at once is 128 bits, the sizes of the input buffer 33 and the output buffer 34 are 256 bits. In this embodiment, the input buffer 33 and the output buffer 34 each store two blocks. The sizes of the input buffer 33 and the output buffer 34 can be changed. The block encryption unit 35 includes, for example, advanced encryption standard (AES) block encryptor. The encryption unit 35 will be described in detail as follows.

Figure 3:
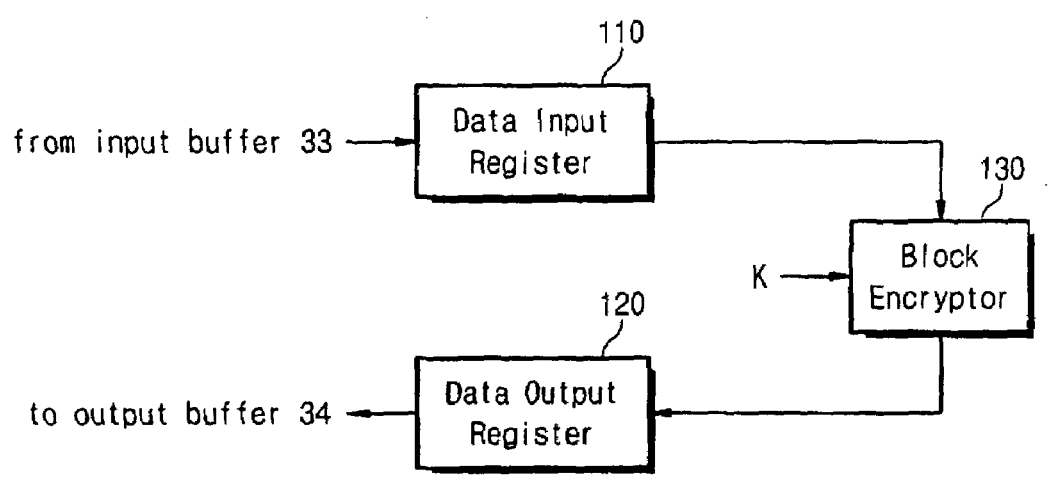
FIG. 3 illustrates a general circuit configuration of the block encryption unit shown in FIG. 2.
Figure 4:
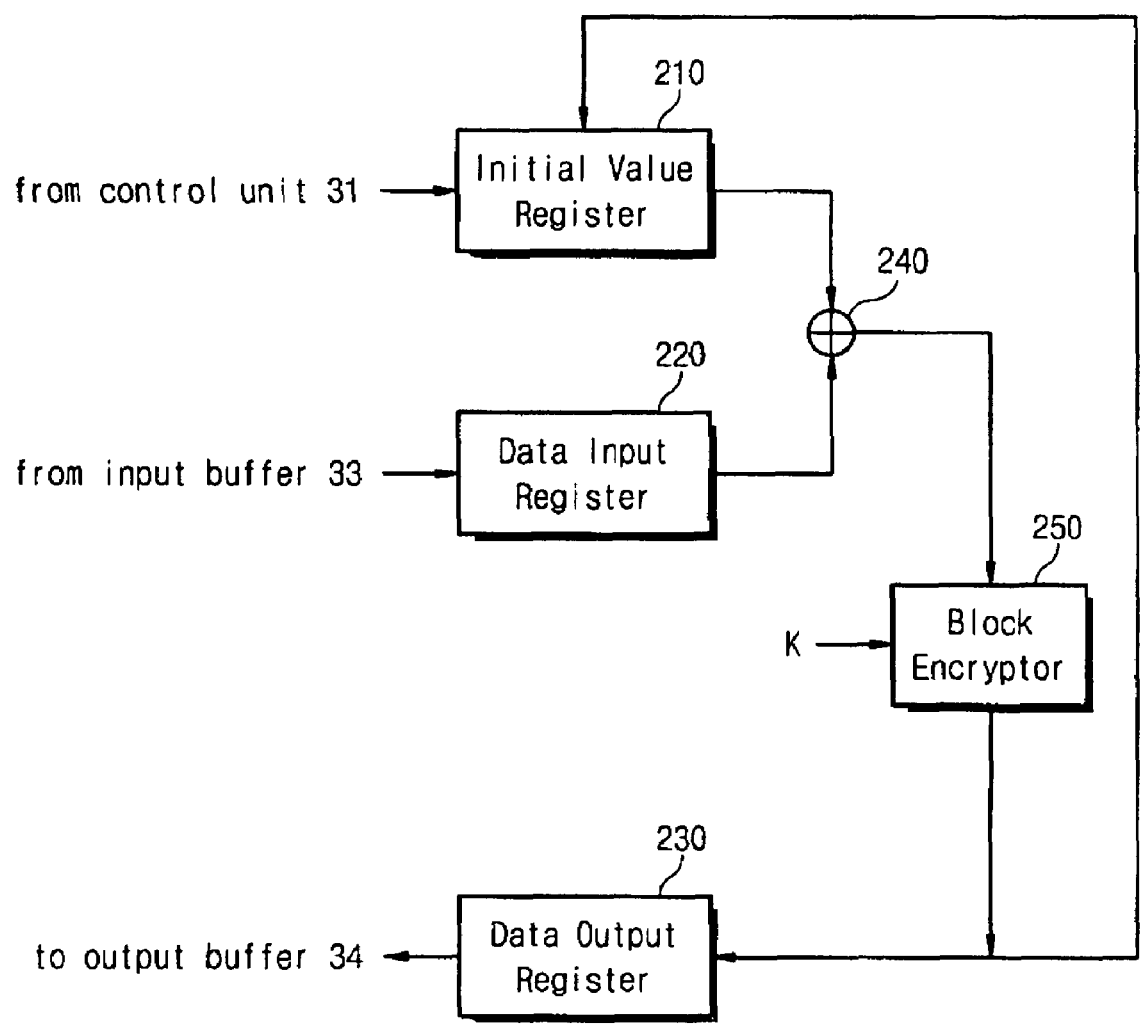
FIG. 4 illustrates the circuit configuration used for the block encryption unit to operate in CBC mode or CBC-MAC mode shown in FIG. 2.
Figure 5:
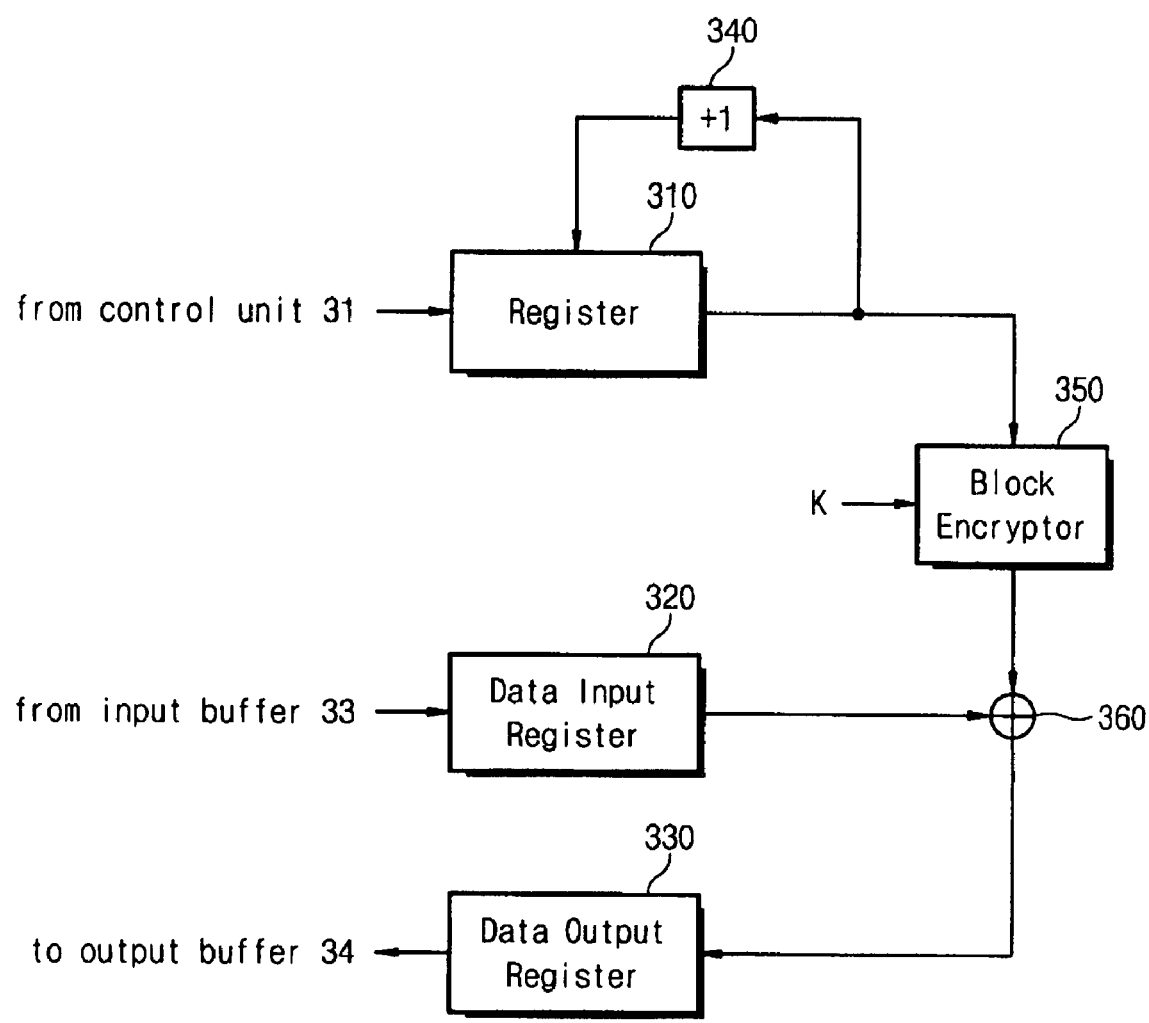
FIG. 5 illustrates the circuit configuration used for the block encryption unit to operate in CNT mode shown in FIG. 2.

FIGS. 3 to 5 illustrate a circuit configuration with relation to the mode of the block encryption unit 35 shown in FIG. 2. FIG. 3 illustrates the circuit configuration used for the block encryption unit 35 to operate in electronic codebook (ECB) mode. Referring to FIG. 3, the block encryption unit 35a of the ECB mode includes a data input register 110, a data output register 120 and a block encryptor 130. The plain text block from the input buffer 33 shown in FIG. 2 is inputted to the block encryptor 130 through the data input register 110. The block encryptor 130 performs encryption according to the key K given from the control unit 31 and outputs cipher text to the data output register 120. The data stored in the data output register 120 is outputted to the output buffer 34 shown in FIG. 2.

FIG. 4 illustrates the circuit configuration used for the block encryption unit to operate in cipher block chain (CBC) mode or CBC-message authentication code (CBC-MAC) mode shown in FIG. 2.

Referring to FIG. 4, the block encryption unit 35b includes an initial value register 210, a data input register 220, a data output register 230, an exclusive-OR operator 240 and a block encryptor 250. The exclusive-OR operator performs exclusive-OR on plain text block from the input buffer 33 shown in FIG. 2 through the data input register 220 and initial vector data set in an initial value register 210. The initial vector data set in the initial value register 210 is provided from the control unit 31. The operation result of the exclusive-OR operator 240 is transferred to the block encryptor 250. The block encryptor 250 encrypts the operation result of the exclusive-OR operator 240 according to key K provided from the control unit 31. The cipher text from the block encryptor 250 is stored in the data output register 230 and the initial value register 210. The data stored in the data output register 230 are outputted to the output buffer 34 shown in FIG. 2 when it is in the CBC mode. However, they are not outputted to the output buffer 34 when it is in the CBC-MAC mode. When it is in the CBC-MAC mode, all the plain text stored in the memory 20 are encrypted and only the final data stored in the initial register 210 are outputted to the output buffer 34.

FIG. 5 illustrates the circuit configuration used for the block encryption unit 35 to operate in the counter (CNT) mode shown in FIG. 2. Referring to FIG. 5, the block encryption unit 35c includes a register 310, a data input register 320, a data output register 330, an adder 340, a block encryptor 350, and an exclusive-OR operator 360. The initial data provided from the control unit 31 are stored in the register 310. The adder 340 adds one to the data stored in the register 310. The output of the adder 340 is stored in the register 310 again. The block encryptor 350 encrypts the data stored in the register 310 according to the key K provided from the control unit 31. The data input register 320 stores the pain text block from the input buffer 33 shown in FIG. 2. The exclusive-OR operator 360 performs exclusive-OR operation on the output of the block encryptor 350 and the plain text stored in the data input register 320, and stores the result of the operation in the data output register 330. The data stored in the data output register 330 is a cipher text and outputted to the output buffer 34 shown in FIG. 2.

As shown in FIGS. 3 through 5, the block encryption unit 35 requires slightly different circuit configuration depending on encryption modes. However, if the circuits for each mode are configured separately, larger circuit area would be required. In the present invention, provided is a block encryption unit which has a simple circuit configuration and operates in all the encryption modes.

Figure 6:
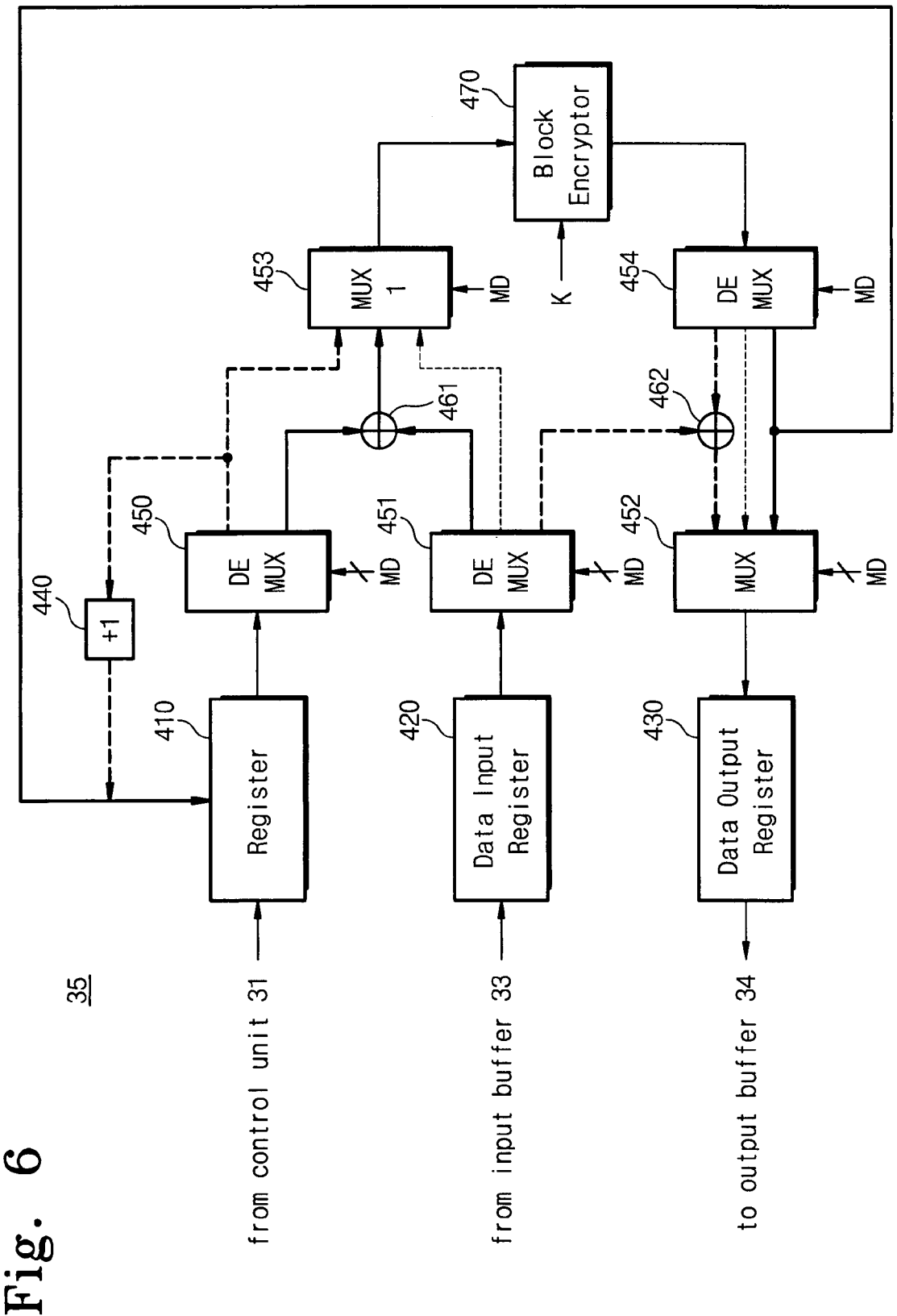
FIG. 6 contains a block diagram of a block encryption unit according to the preferred embodiment of the present invention.

FIG. 6 illustrates a block encryption unit 35 according to a preferred embodiment of the present invention.

Referring to FIG. 6, the block encryption unit 35 includes a register 410, a data input register 420, a data output register 430, an adder 440, multiplexers 453 and 452, demultiplexers 450, 451 and 454, exclusive-OR operators 461 and 462 and a block encryptor 470. When the present invention is applied to WLAN, the block encryptor 470 shown in FIG. 6 is configured as an advanced encryption standard (AES) block encryptor but can be configured as another block encryptor such as a data encryption standard (DES) block encryptor or 3-DES block encryptor in other applications.

The register 410 is used in the CBC, CBC-MAC and CNT modes. The control unit 31 shown in FIG. 2 sets the initial value for the register 410. The data input register 420 stores the plain text block inputted from the input buffer 33 shown in FIG. 2. The data output register 430 stores the cipher text outputted from the multiplexer 452. The multiplexers 453 and 452 and demultiplexers 450, 451 and 454 operate in response to the mode signal MD from the control unit 31. The mode signal MD indicates the mode of the block encryption unit 35 and is configured of a plurality of bits. In this embodiment, since the block encryption unit 35 operates in the CBC, CBC-MAC or CNT mode, the mode signal is configured of two bits. For instance, if the mode signal MD is '00', it indicates the ECB mode. If the mode signal MD is '01', it indicates the CBC mode. If the mode signal MD is '10', it indicates the CBC-MAC mode. If the mode signal MD is '11', it indicates the CNT mode. In FIG. 6, the bold dashed line implies a data moving path in the CNT mode; the bold solid line implies a data moving path in the CBC or CBC-MAC mode; the non-bold dashed line implies a data moving path in the ECD mode and the solid line implies a data moving path in all the modes.

The demultiplexer 450 transfers the data stored in the register 410 to the adder 440 and the multiplexer 453 when the mode signal MD implies the CNT mode. The demultiplexer 450 transfers the data stored in the register 410 to the exclusive OR operator 461 when the mode signal MD implies the CBC mode or the CBC-MAC mode. The demultiplexer 451 transfers the plain text block stored in the register 420 to the exclusive-OR operator 461 when the mode signal MD implies the CBC mode or the CBC-MAC mode. The demultiplexer 451 transfers the plain text block stored in the register 420 to the multiplexer 453 when the mode signal MD implies the ECB mode. The demultiplexer 451 transfers the plain text block stored in the register 420 to the exclusive-OR operator 462 when the mode signal MD implies the CNT mode. The multiplexer 453 transfers one of the outputs of the demultiplexers 450 and 451 and the output of the exclusive-OR operator 461 to the block encryptor 470 in response to the mode signal. That is, the multiplexer 453 transfers the output of the demultiplexer 450 to the block encryptor 470 when the mode signal MD is the CNT mode. The multiplexer 453 transfers the output of the exclusive-OR operator 461 to the block encryptor 470 when the mode signal MD is the CBC mode or the CBC-MAC mode. The multiplexer 453 transfers the output of the demultiplexer 451 to the block encryptor 470 when the mode signal MD is the ECB mode.

The demultiplexer 454 transfers cipher text outputted from the block encryptor 470 to the exclusive-OR operator 462, the multiplexer 452 or/and the register 410 in response to the mode signal. That is, the demultiplexer 454 transfers the cipher text from the block encryptor 470 to the exclusive-OR operator 462 when the mode signal MD indicates the CNT mode. The demultiplexer 454 transfers the cipher text from the block encryptor 470 to the multiplexer 452 when the mode signal MD indicates the ECB mode. The demultiplexer 454 transfers the cipher text from the block encryptor 470 to the multiplexer 452 and the register 410 when the mode signal MD indicates the CBC mode or the CBC-MAC mode. The multiplexer 452 transfers the operation result of the exclusive-OR operator 462 to the data output register 430 when the mode signal MD indicates the CNT mode. The multiplexer 452 transfers the output of the demultiplexer 454 to the data output register 430 when the mode signal MD indicates the ECB mode, the CBC mode, or the CBC-MAC mode.

As described above, the block encryption unit 35 of the present invention includes registers 410, 420 and 430, an adder 440, multiplexers 453 and, demultiplexers 450, 451 and 454, exclusive-OR operators 461 and 462, and a block encryptor 470 and can operate in all of the ECB mode, the CBC mode, the CBC-MAC mode and the CNT mode.

Figure 7:
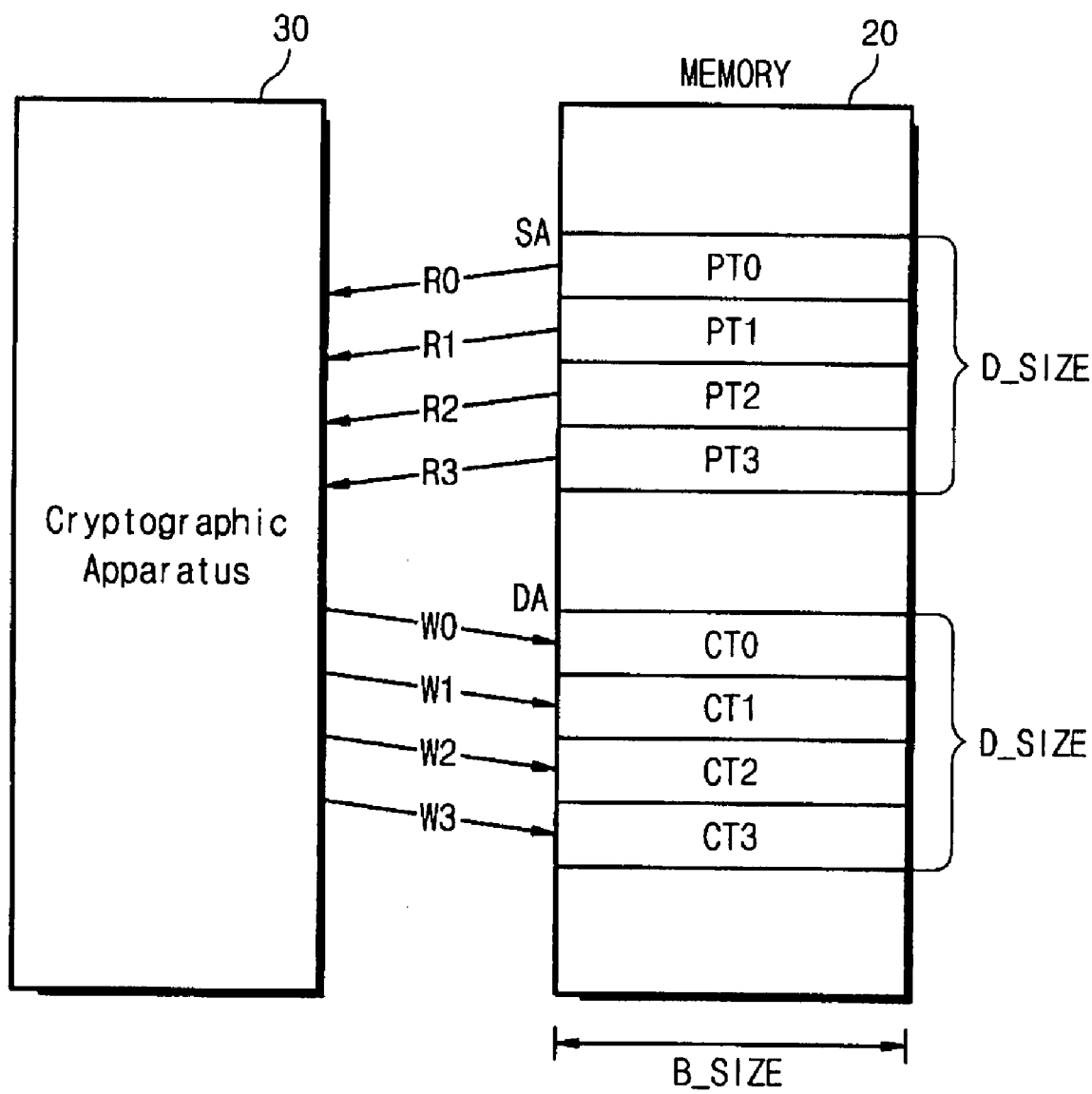
FIG. 7 illustrates an example of data communication between a cryptographic apparatus and a memory shown in FIG. 1.

FIG. 7 illustrates an example of data communication between a cryptographic apparatus 30 and a memory 20 shown in FIG. 1. The cryptographic apparatus 30 accesses the memory 20 according to a source address SA, a destination address DA and data size D_SIZE provided from the CPU 10. As shown in FIG. 7, the cryptographic apparatus 30 reads the plain text stored at the source address SA of the memory 20 and encrypts it. The cryptographic apparatus 30 stores the encrypted cipher text to the destination address DA of the memory 20. The cryptographic apparatus 30 writes the cipher text CT0 to the memory 20 in a zeroth write step W0 when encryption of the read plain text PT0 is completed in a readout step R0. Similarly, the remaining readout steps R1, R2 and R3 and the remaining write steps W1, W2 and W3 are performed sequentially. However, if the cryptographic apparatus 30 performs the zeroth readout step R0 and the zeroth write step W0 sequentially and performs a first readout step R1 again, the performance of the cryptographic apparatus 30 is caused to degenerate. It is because the block encryption unit 35 in the cryptographic apparatus 30 is idle without any operation while the cryptographic apparatus 30 writes cipher text in the memory 20. In the present invention, to overcome this problem, as described above, the input buffer 33 and the output buffer 34 (refer to FIG. 2) are configured to be double as large as the block size. Therefore, the readout steps and the write steps are not performed as R0, W0, R1 and W1 but the order to perform them can be changed variously. The readout and write methods will be described.

As described above, the idle time of the block encryption unit 35 should be minimized to realize maximum performance of the cryptographic apparatus 30. To do so, it is important to prevent the input data from entering a starvation state. In the present invention, the input buffer 33 is twice as large as the block size inputted to the block encryption unit 35. That is, the input buffer stores two blocks. Therefore, new data can be written to the input buffer 33 while the block encryption unit 35 performs encryption. The cipher text outputted from the block encryption unit 35 is temporarily stored in the output buffer 34. So the block encryption unit 35 can encrypt the next plain text block even before the cipher text is written to the memory 20.

Meanwhile, the DMA controller 32 cannot read out the plain text from the memory 20 and writes the cipher text to the memory 20 simultaneously. Therefore, the control unit 31 controls the DMA controller 32 to read out and write according to the predetermined priority. Table 1 illustrates the operation priority of the DMA controller 32 according to the number of blocks stored in the input buffer 33 and the output buffer 34.

TABLE 1

| The number of blocks stored in an input buffer 32 (IBUFCNT) | The number of blocks stored in an input buffer 34 (OBUFCNT) | DMA process |
|---|---|---|
| 2 | 0 | NOP |
| 1 | 0 | Readout |
| 0 | 0 | Readout |
| 2 | 1 | Write |
| 1 | 1 | Readout |
| 0 | 1 | Readout |
| 2 | 2 | Write |
| 1 | 2 | Write |
| 0 | 2 | Readout |

The basic concept of Table 1 is that the priority is given to the readout operation if there is a vacancy in the buffer 33. If there is at least one block stored in the output buffer 34, the priority is given to the write operation. In Table 1, when the input buffer 33 is completely empty and the output buffer is completely filled, if the block encryption unit 35 does not operate, it is preferable that the plain text block is read out to the input buffer to control the block encryption unit 35 to operate and the cipher text stored in the output buffer 34 is written to the memory 20. However, when the input buffer 33 is completely empty and the output buffer is completely filled, if the block encryption unit 35 operates, any of the readout operation and the write operation can be performed. However, since the operation reference is necessary, the DMA controller 32 is set to perform the readout operation. The NOP (no operation) shown in Table 1 means that the DMA controller 32 does not perform any operation.

Similarly, each of the input buffer 32 and the output buffer 34 is configured to store at least two blocks. The encryption unit 35 can perform a block encryption process using the buffers 33 and 34 even though the system bus 50 is in BUSY state.

Figure 8:
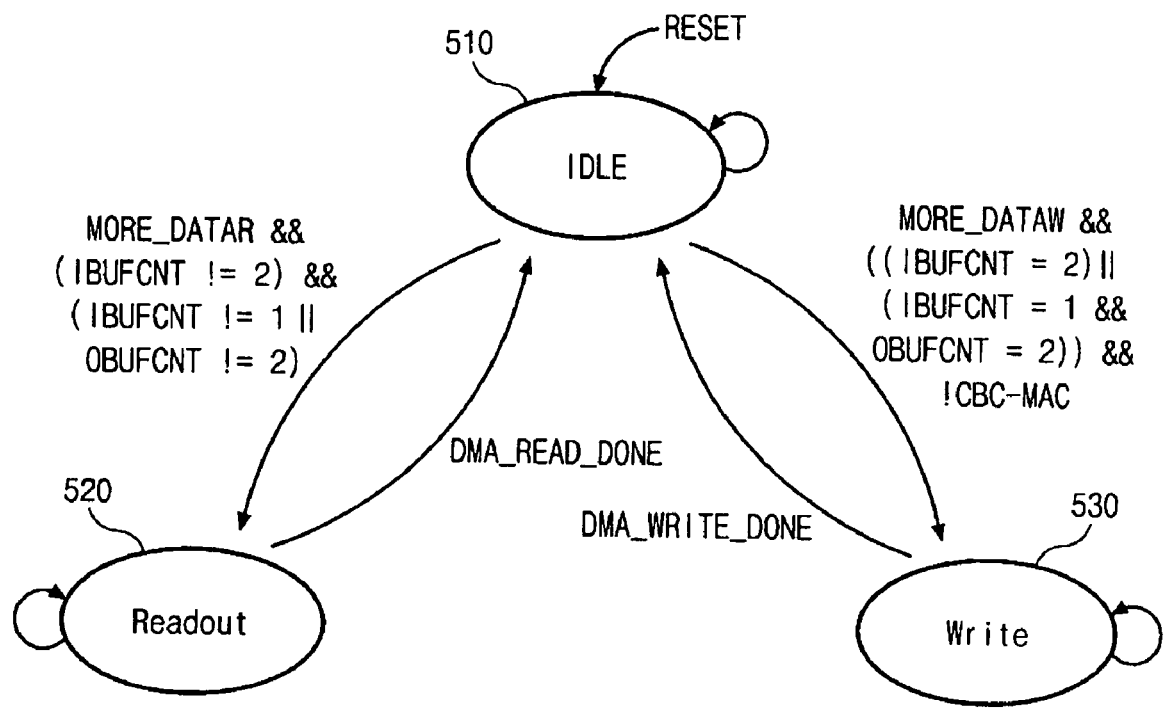
FIG. 8 illustrates a finite state machine (FSM) of a DMA controller shown in FIG. 2.

FIG. 8 illustrates a finite state machine (FSM) of a DMA controller shown in FIG. 2. In FIG. 8, the readout control signal MORE_DATAR is 1 when the size D_SIZE of the entire data which should be read out at the source address SA of the memory 20 and encrypted is greater than the size of the data read out from the memory 20 by the DMA controller 32 until now. The readout control signal MORE_DATAR is 0 when the size D_SIZE is less than or equal to the size of the data read out from the memory 20 by the DMA controller 32 until now. The write control signal MORE_DATAW is 1 when the size DATA_SIZE of the entire data which should be written at the destination address DA of the memory 20 and encrypted is greater than the size of the data written by the DMA controller 32 until now. The write control signal MORE_DATAW is 0 when the size DATA_SIZE is less than or equal to the size of the data written by DMA controller 32 until now.

The control unit 31 controls the DMA controller 32 to transit from idle state 510 to readout state 520 if Expression 1 is satisfied.

MORE_DATAR && (RBUFCNT !=2) && (RBUFCNT !=1∥WBUFCNT !=2)=1   Expression 1

When the DMA controller 32 completes to read out the data from the memory 20 (DMA_READ), the readout completion signal DMA_READ_DONE is activated and transits from readout state 520 to idle state 510. Here, the readout count DMA_READ_CNT is increased by 1.

The control unit 31 controls the DMA controller 32 to transit from idle state 510 to read state 530 when Expression 2 is satisfied.

$$\text{MORE\_DATAW \&\& ((RBUFCNT !=2)||(RBUFCNT !=1 \&\& WBUFCNT !=2)) \&\& !CBC-MAC=1} \quad \text{Expression 2}$$

The DMA controller 32 activates the write completion signal DMA_WRITE_DONE) and transits from write state 530 to idle state 510 if it is completed write the data to the memory 20 (DMA_WRITE). Here, the write count DMA_WRITE_CNT is increased by one. The readout completion signal DMA_READ_DONE and the write completion signal DMA_WRITE_DONE are supplied to the control unit 31 and the readout count DMA_READ_CNT and the write count DMA_WRITE_CNT are the values of the counters (now shown) configured in the control unit 31.

The state of the readout control signal MORE_DATAR according to the relation between the size DATA_SIZE of the data read out from the memory 20 and the readout count DMA_READ_CNT and the state of the write control signal MORE_DATAW according to the relation between the size DATA_SIZE of the data written to the memory 20 and the write count DMA_WRITE_CNT are illustrated in Tables 2 and 3.

TABLE 2

| Readout control signal (MORE_DATAR) | Condition |
| --- | --- |
| 0 | DATA_SIZE < DMA_READ_CNT |
| 1 | DATA_SIZE > DMA_READ_CNT |

TABLE 3

| Write control signal (MORE_DATAW) | Condition |
| --- | --- |
| 0 | DATA_SIZE < DMA_WRITE_CNT |
| 1 | DATA_SIZE > DMA_WRITE_CNT |

Figure 9:
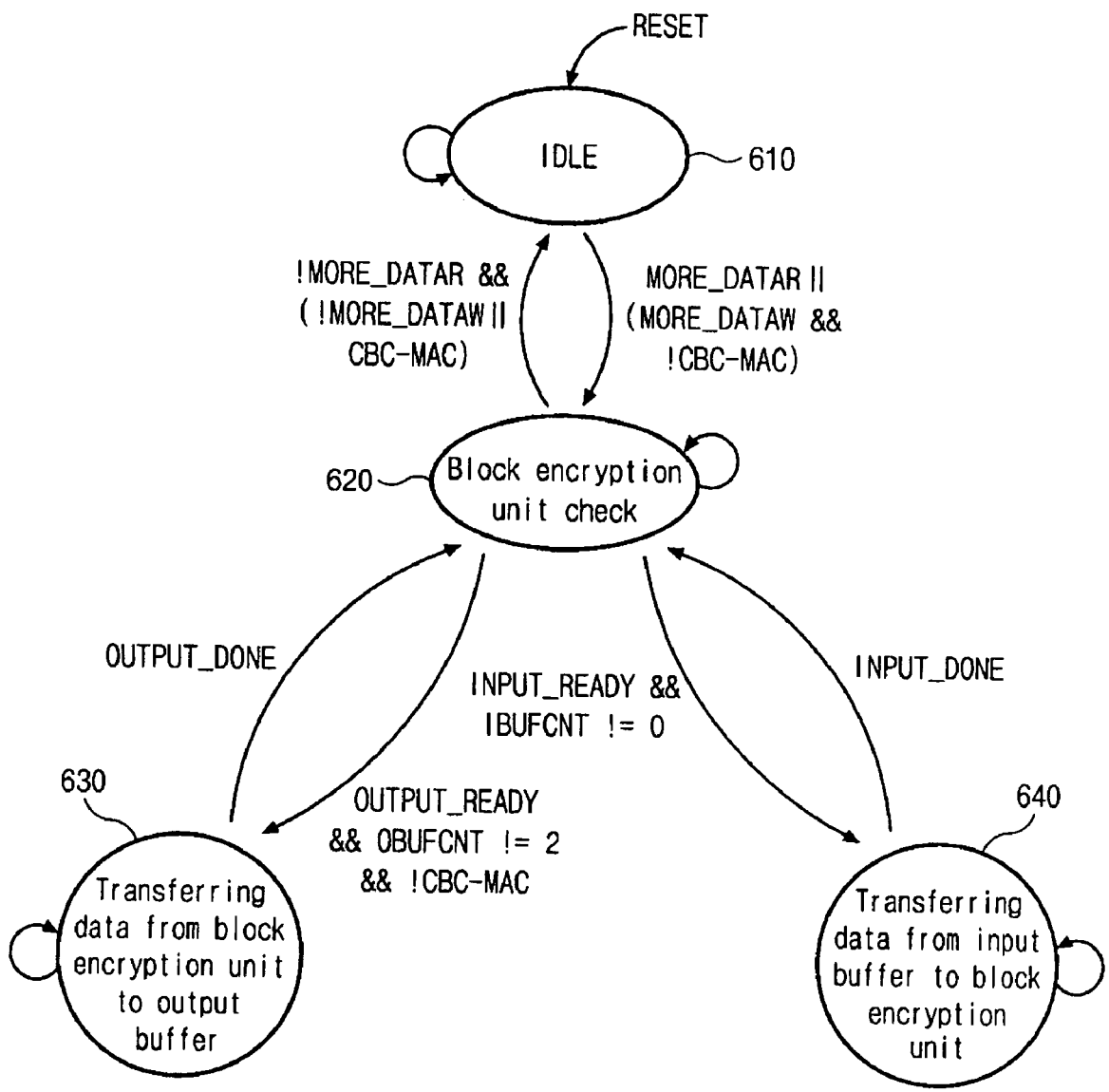
FIG. 9 illustrates an FSM according to relation of an input buffer, an output buffer and a block encryption unit shown in FIG. 2.

FIG. 9 illustrates an FSM according to relation of an input buffer 33, an output buffer 34 and a block encryption unit 35 shown in FIG. 2. Referring to FIG. 9, the control unit 31 controls the block encryption unit 35 to transit from idle state 610 to block encryption unit 35 check state 620 if the data remains to be processed by the block encryption unit 35 (that is, the readout control signal is one). The block encryption unit 35 activates input ready signal INPUT_READY to 1 when the encryption is ready to begin. The block encryption unit 35 activates completion signal OUTPUT_READY to 1 when it is completed to encrypt the current inputted block.

The block encryption unit 350 in check state 620 transits to the state 640 to transfer data from the input buffer 33 to the block encryption unit 35 if the input ready signal INPUT_READY is 1 and there are any data in the input buffer 33. If it is completed to transfer data from the input buffer 33 to the block encryption unit 35, the block encryption unit 35 activates the input completion signal INPUT_DONE and transits to the check state 620.

The block encryption unit 350 in the check state 620 transits to the state 630 to transfer data from the block encryption unit 35 to the output buffer 34 if the output ready signal OUTPUT_READY is 1 and the output-buffer 33 is not completely filled. When it is completed to transfer data from the block encryption unit 35 to the output buffer 34, the block encryption unit 35 activates the output completion signal OUTPUT_DONE and transits to the check state again.

In FIGS. 8 and 9, in the CBC_MAC mode, since the cipher text generated when it is completed to encrypt each block is not necessary, it is not necessary to write to the cipher text to the memory 20. Therefore, to minimize using the system bus 50 of the cryptographic apparatus 30, in the CBC-MAC mode, when it is completed to encrypt all the blocks, it is necessary only to write the data stored in the register 410 to the destination address DA of the memory 20 once.

Figure 10A:
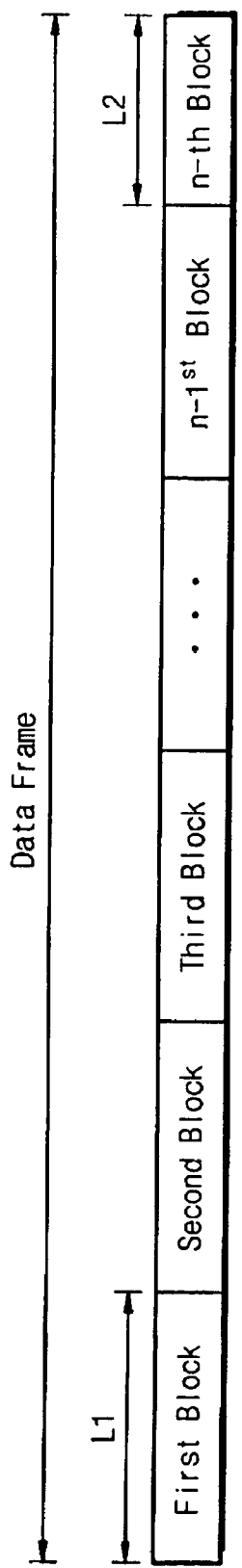
FIGS. 10a and 10b illustrate an example of zero-padding to insert '0' to the end of data.
Figure 10B:
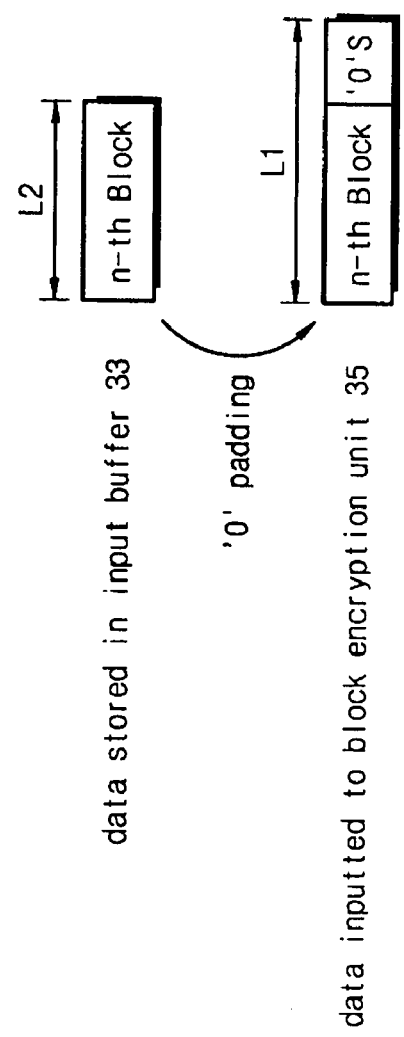

FIGS. 10a and 10b illustrate an example of zero-padding to insert '0' to the end of data. Referring to FIG. 10a, when the data frame consists of n frames and the size of one block is L1, the size of the last n-th block is always not L1. For example, if the size L2 of the n-th block is less than the L1, zero-padding is performed to insert '0' to the end of the data so that the size of the n-th block can be L1. That is, the control unit 31 performs zero-padding on the last block inputted to the input buffer 33 through the DMA controller 32 if the size of the data received from the CPU 10 is not large as the multiple of integer of the block size. As shown in FIG. 10b, the control unit 31 inserts '0's to the last of the n-th block stored in the input buffer 33 so that the size of the n-th block can be L1.

That is, the data communicated between the CPU 10 and the encryption unit 20 is as follows. First, the CPU 10 transfers control information to the control unit 31 of the cryptographic apparatus 30. The control information includes source address, destination address, data size, key, key size, direction (encryption or decryption), initial vector and mode.

Basically, the data to be encrypted, that is, the plain text, should be stored at the source address of the memory 20. Then, the CPU 10 informs the cryptographic apparatus 30 of the control information and the cryptographic apparatus 30 performs encryption. The cipher text is stored at the destination address. According to the present invention, the interconnection between the CPU 10 and the cryptographic apparatus 30 is minimized to prevent the performance of the system from degenerating.

Meanwhile, the control information and the data communicated between the CPU 10 and the cryptographic apparatus 30 depend on the mode. In the ECB mode, the plain text should be stored at the source address of the memory 20 and the cipher text is stored at the destination address of the memory 20. In the ECB mode, the source address may be the same as the destination address. The control information which the CPU 10 should supply to the cryptographic apparatus 30 includes source address, destination address, key, key size, data size, direction and mode. In the ECB mode, the cipher text should be stored at the destination address of the memory 20 whenever it is completed to encrypt each of the blocks.

The CBC mode is similar to the ECB mode but the initial vector should be included in the control information. In the CBC-MAC mode, the cipher text does not have to be written to the memory 20 every block since the cipher text for each block is unnecessary. It should be completed to encrypt all the blocks and the data stored in the register 410 should be transferred to the CPU 10.

Figure 11:
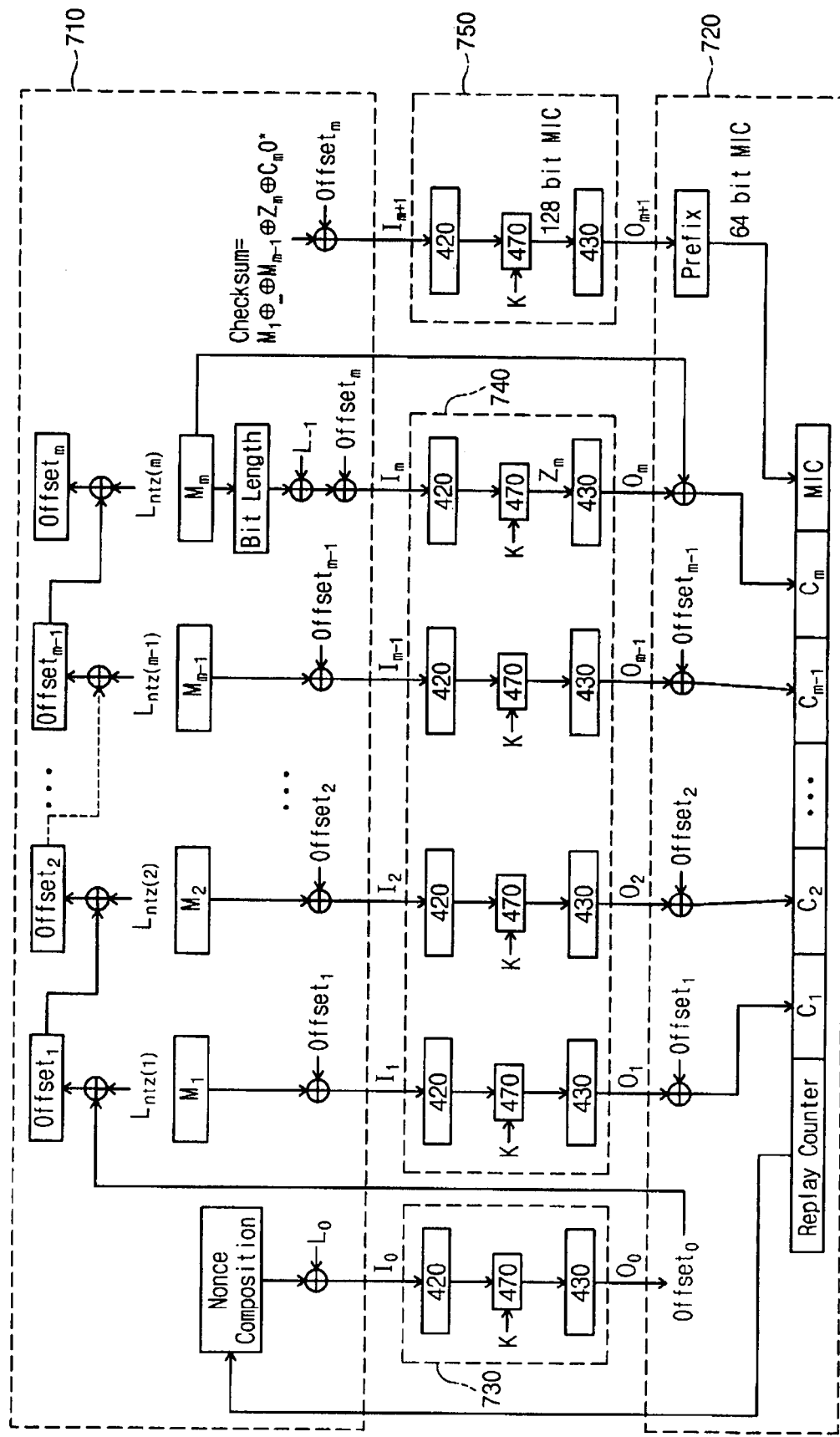
FIG. 11 illustrates schematically an encryption process of OCB mode.
Figure 12:
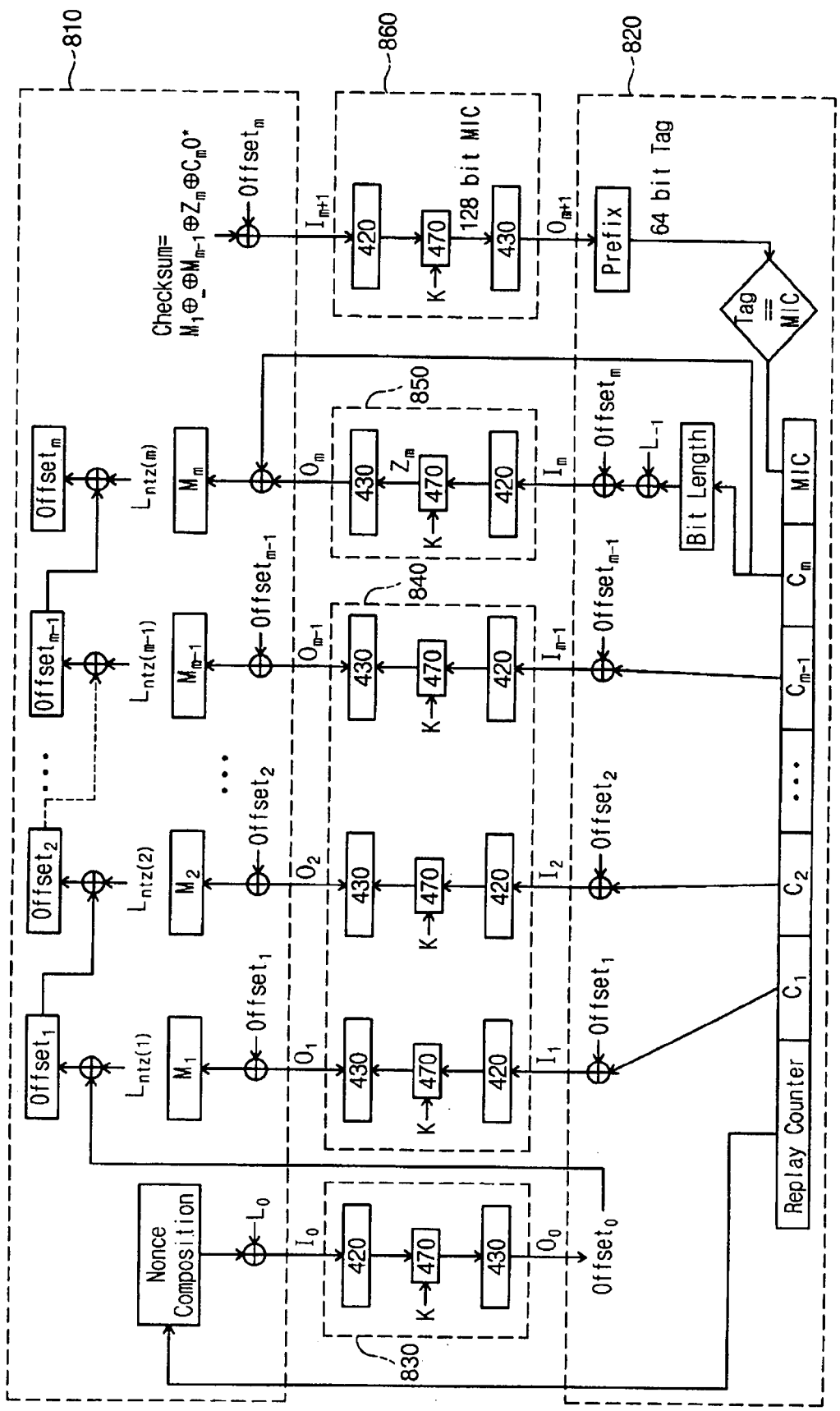
FIG. 12 illustrates schematically a decryption process of OCB mode.

The OCB mode requires substantial computation by the CPU 10. FIG. 11 illustrates schematically an encryption process of the OCB mode. FIG. 12 illustrates schematically a decryption process of the OCB mode. The cryptographic apparatus 30 of the present invention generates cipher text of each block according to the deliberately designed codebook and offset. In FIG. 11, the portions depicted by the reference numerals 710 and 720 is operated by the CPU 10 and the first to third stages depicted by the reference numerals 730, 740 and 750 are performed by the cryptographic apparatus 30.

Figure 13:
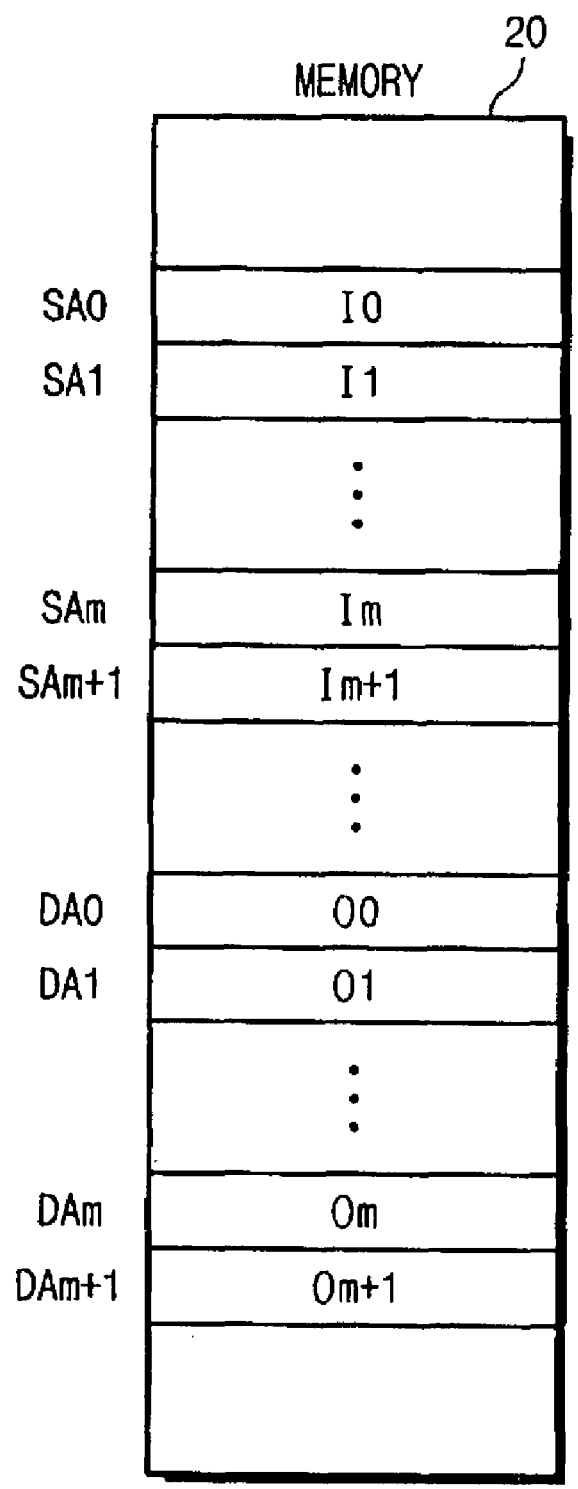
FIG. 13 illustrates data blocks $I_0$-$I_{m+1}$ stored at source addresses $SA_0$-$SA_{m+1}$ of a memory shown in FIG. 1 and data blocks $O_0$-$O_{m+1}$ stored at destination addresses $DA_0$-$DA_{m+1}$ of a memory shown in FIG. 1.

FIG. 13 illustrates data blocks $I_0$-$I_{m+1}$ stored at source addresses $SA_0$-$SA_{m+1}$ of a memory shown in FIG. 1 and data blocks $O_0$-$O_{m+1}$ stored at destination addresses $DA_0$-$DA_{m+1}$ of a memory shown in FIG. 1.

Referring to FIGS. 11 and 13, the cryptographic apparatus 30 operates in the OCB mode as in the ECB mode. In the first stage 730, the data block $I_0$ stored in the source address $SA_0$ of the memory 20 is stored in the data input register 420 (FIG. 6). The block encryptor 470 encrypts the data block 10 stored in the data input register 420 and the result is stored in the data output register 450. The data stored in data output register 450 is transferred to the CPU 10 as $Offset_0$. The CPU 10 calculates offsets $Offset_1$-$Offset_m$ according to $Offset_0$ supplied from the cryptographic apparatus 30 and the deliberately set codebook Lntz(1)-Lntz(m), performs exclusive-OR operation on the plain texts M1-Mm stored in a predetermined area of the memory and calculated offsets $Offset_1$-$Offset_m$, and stores the operation result at the source addresses $SA_1$-$SA_{m+1}$ of the memory 20.

In the second stage 740, the cryptographic apparatus 30 reads out the data blocks stored at the source addresses $SA_1$-$SA_{m+1}$ of the memory 20, performs encryption, and stores the encrypted data blocks $O_0$-$O_{m+1}$ at the destination addresses $DA_1$-$DA_{m+1}$ of the memory 20.

When the second stage 740 of the cryptographic apparatus 30 completes its operation, the CPU 10 performs exclusive-OR operation on the data blocks $O_0$-$O_{m+1}$ stored in the destination addresses $DA_0$-$DA_{m+1}$, the offsets $Offset_1$-$Offset_{m-1}$ and the plain text Mm and generate cipher texts C1-Cm. The CPU 10 performs exclusive-OR operation on checksum and $Offset_m$ and stores the operation result at the source address $SA_{m+1}$.

In the third stage, the cryptographic apparatus 30 reads out the data block $I_{m+1}$ stored at the source address $SA_{m+1}$, performs encryption and stores the encrypted data block $O_{m+1}$ at the destination address $DA_{m+1}$ of the memory 20. The CPU 10 reads out the data $O_{m+1}$ stored at the destination address $DA_{m+1}$ of the memory 20 and takes some of the data $O_{m+1}$ as MIC.

Referring to FIG. 12, decryption of the OCB mode will be described. In FIG. 12, the part depicted by the reference numerals 810 and 820 is operated by the CPU 10 and the first to fourth stages depicted by the references 830, 840, 850 and 860 are performed by the cryptographic apparatus 30. The decryption of the OCB mode is performed in the opposite order of the encryption of the OCB mode shown in FIG. 11 but the decryption is performed through the four stages 830-860. Here, the decryption of the OCB mode is performed after setting the cryptographic apparatus 30 to be decryption of the ECB mode.

According to the present invention, implemented is the cryptographic apparatus to operate in the ECB, CBC, CBC-MAC, counter and OCB modes using small and simple elements. In addition, the data communication between the CPU and the cryptographic apparatus is minimized to improve the performance of the communication system. On the other hand, the input buffer and output buffer configured in the cryptographic apparatus are configured to store at least two blocks respectively so that the performance of the cryptographic apparatus is maximized. Furthermore, the cryptographic apparatus supports zero-padding so that the process of the CPU is minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cryptographic apparatus for encrypting data stored in a memory, the apparatus comprising:

a control unit for generating control signals in response to externally supplied encryption information;

a memory controller for reading out the data from the memory;

an input buffer for storing the data read out by the memory controller;

an encryption unit for encrypting a data block stored in the input buffer; and an output buffer for storing the data encrypted by the encryption unit;

wherein the memory controller writes the encrypted data stored in the output buffer to the memory, the memory controller, the input buffer, the encryption unit and the output buffer operate in response to the control signals, wherein the mode is any one selected from a group consisting of electronic codebook (ECB) mode, cipher block chaining (CBC) mode, CBC-message authentication (CBC-MAC) mode and counter (CNT) mode, and wherein the encryption unit comprises:

an initial vector register for storing an initial vector supplied from the control unit;

a data input register for storing the data supplied from the input buffer;

an encryptor for encrypting input data;

a data output register for storing data to be supplied to the output buffer;

an adder;

a first selection circuit for supplying any one of data stored in the initial vector register, result data of logic operation of the data stored in the initial vector register and the data stored in the data input register, and the data stored in the data input register to the encryptor as input data in response to the mode signal, and supplying the data stored in the initial vector register to the adder in response to the mode signal; and a second selection circuit for supplying any one of result data of logic operation of the data stored in the data input register and the data encrypted by the block encryptor, and the data encrypted by the block encryptor to the data output register in response to the mode signal, and supplying the data encrypted by the encryptor to the initial vector register in response to the mode signal, wherein the adder adds a predetermined value to data supplied from the first selection circuit and stores it in the initial vector register, wherein the first selection circuit comprises:

a first multiplexer;

a first logic operator;

a second multiplexer for supplying the data stored in the initial vector register to both the adder and the first multiplexer or the first logic operator in response to the mode signal; and a third multiplexer for supplying the data stored in the initial vector register to the first logic operator or the first multiplexer in response to the mode signal;

wherein the first logic operator received outputs from the second and third multiplexers and performs logic operation on them, and the first multiplexer transfers any one of an output of the second multiplexer, an output of the first logic operator and an output of the third multiplexer to the encryption.

2. The cryptographic apparatus of claim 1, wherein the second selection circuit comprises:

a fourth multiplexer;

a second logic operator; and a fifth multiplexer for transferring an output of the encryption to any of the second logic operator, the fourth multiplexer, the initial vector register and both the fourth multiplexer and the initial vector register in response to the mode signal, wherein the second logic operator receives outputs of the third and fifth multiplexers and performs logic operation, and the fourth multiplexer transfers an output of the second logic operator and an output of the fifth multiplexer as the data output data.

* * * * *